(12) United States Patent
Kato et al.

(10) Patent No.: US 7,379,056 B2
(45) Date of Patent: May 27, 2008

(54) SYSTEM AND METHOD FOR TAKING OVER A DOCUMENT

(75) Inventors: Yosuke Kato, Tokyo (JP); Takumi Hayashi, Tokyo (JP); Kenji Fujii, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 691 days.

(21) Appl. No.: 10/849,225

(22) Filed: May 20, 2004

(65) Prior Publication Data

US 2005/0015270 A1    Jan. 20, 2005

(30) Foreign Application Priority Data

Jul. 18, 2003   (JP)   ............................. 2003-276968

(51) Int. Cl.
*G06F 3/033*   (2006.01)
(52) U.S. Cl. ..................................... 345/179; 178/19.01
(58) Field of Classification Search ................ 345/179, 345/169, 182; 705/1; 709/229; 382/187; 178/18.01, 19.01; 715/500
See application file for complete search history.

(56) References Cited

U.S. PATENT DOCUMENTS

| | | | |
|---|---|---|---|
| 6,466,804 B1 * | 10/2002 | Pecen et al. ................ | 455/558 |
| 6,570,104 B1 | 5/2003 | Ericson et al. | |
| 6,922,721 B1 * | 7/2005 | Minborg et al. ............ | 709/219 |
| 6,944,664 B1 * | 9/2005 | Chantrain et al. .......... | 709/227 |
| 7,076,732 B2 * | 7/2006 | Nagao ........................ | 715/536 |
| 7,113,173 B1 * | 9/2006 | Bi et al. ..................... | 345/169 |
| 7,143,349 B2 * | 11/2006 | Marukawa .................. | 715/530 |
| 7,165,054 B2 * | 1/2007 | Geoghegan .................. | 706/16 |

FOREIGN PATENT DOCUMENTS

| | | |
|---|---|---|
| DE | 19644109 A1 | 5/1997 |
| JP | 08-297713 A | 11/1996 |
| WO | WO 03/046708 A1 | 6/2003 |

* cited by examiner

*Primary Examiner*—Richard Hjerpe
*Assistant Examiner*—Abbas Abdulselam
(74) *Attorney, Agent, or Firm*—Antonelli, Terry, Stout & Kraus, LLP.

(57) ABSTRACT

A document taking-over system includes a terminal device provided with an electronic pen which gets information written by hand on a document prepared to be able to specify a kind thereof together with kind information of the document as electronic data and for transmitting the electronic data, a document taking-over apparatus for processing the electronic data to produce it as document information of XML format, a correspondence retrieval apparatus for transmitting connection information to the document taking-over apparatus to the terminal device, and a system disposed at a latter stage to utilize the document information processed by the document taking-over apparatus, which are connected to one another through a network.

11 Claims, 16 Drawing Sheets

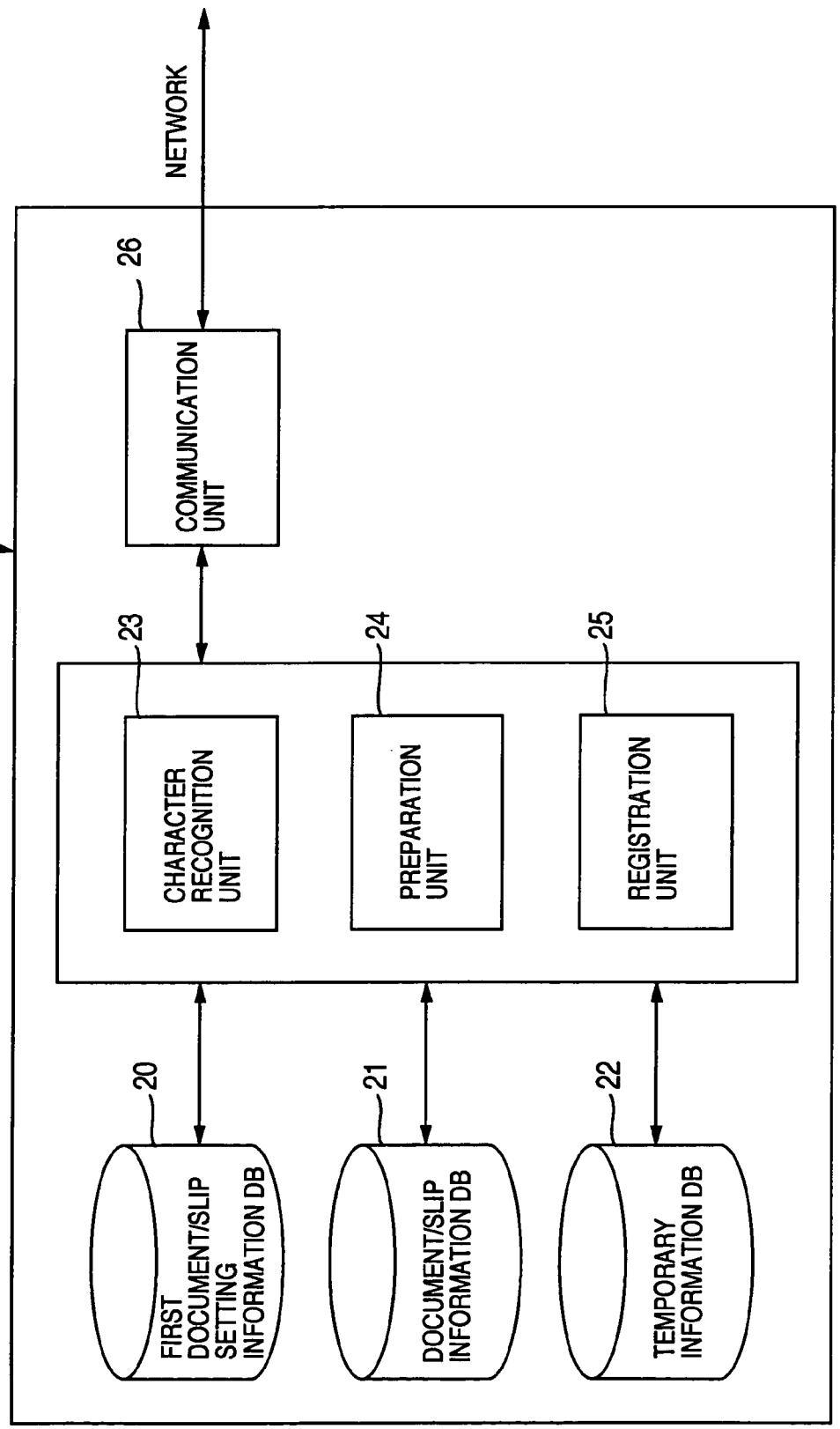

FIG.4

| | | |
|---|---|---|
| PAGE ADDRESS | 99.99.99.99 | |
| DOCUMENT/SLIP DEFINITION FILE | TEST 1.XML | |
| AREA ID | 001 | |
| AREA NAME | FAMILY NAME | |
| ENTERING INDISPENSABLE | Yes ∨ | No □ |
| TRANSFER INFORMATION | Yes ∨ | No □ |
| ATTRIBUTE | CHARACTER ∨ | SELECTION □ IMAGE □ |
| CHARACTER RECOGNITION | Yes ∨ | No □ |
| MAXIMUM NUMBER OF CHARACTERS | 10 | |
| NUMBER OF ENTERABLE LINES | 10 | |
| OUTER FRAME | PRESENCE □ | NO PRESENCE ∨ |
| MAXIMUM SELECTION VALUE | | |

[REGISTRATION] [NEXT] [END]

FIG.10

DEMAND OF OPENING OF OFFICIAL DOCUMENT

DEMANDANT

| NAME | (FAMILY NAME) YAMADA | (GIVEN NAME) TARO |
|---|---|---|
| ADDRESS | 2-3 △△CITY○○DISTRICT○○PREFECTURE | |
| TELEPHONE NUMBER | 012-345-6789 | |

| SUBJECT OR CONTENTS OF OFFICIAL DOCUMENT TO BE DEMANDED | DOCUMENT NUMBER | SUBJECT |
|---|---|---|
| | | |

CLASSIFICATION OF DEMANDANT: 1 PERSON HAVING RESIDENCE WITHIN CITY  ② PERSON HAVING OFFICE WITHIN CITY  3 PERSON WORKING IN OFFICE WITHIN CITY  4 PERSON BEING AT SCHOOL WITHIN CITY

CLASSIFICATION OF OPENING METHOD: 1 READING  2 DELIVERY OF COPY  3 MAIL OF COPY

PURPOSE OF DEMAND: 1 COLLECTION  2 INVESTIGATION AND RESEARCH  3 LEARNING AND STUDY  4 LAWSUIT  5 OTHERS

CONFIRMATION COLUMN: ENTER "✓" MARK IN LEFT CONFIRMATION COLUMN IF ALL SETTING IS ENDED

NAME 1: YAMADA

NAME 2: TARO

ADDRESS: 2-3 △△CITY○○DISTRICT○○PREFECTURE

CLASSIFICATION OF DEMANDANT:
1 PERSON HAVING RESIDENCE WITHIN CITY
② PERSON HAVING OFFICE WITHIN CITY
3 PERSON WORKING IN OFFICE WITHIN CITY
4 PERSON BEING AT SCHOOL WITHIN CITY

☐ PERSON HAVING RESIDENCE WITHIN CITY
☒ PERSON HAVING OFFICE WITHIN CITY
☐ PERSON WORKING IN OFFICE WITHIN CITY
☐ PERSON BEING AT SCHOOL WITHIN CITY

OK   CANCEL

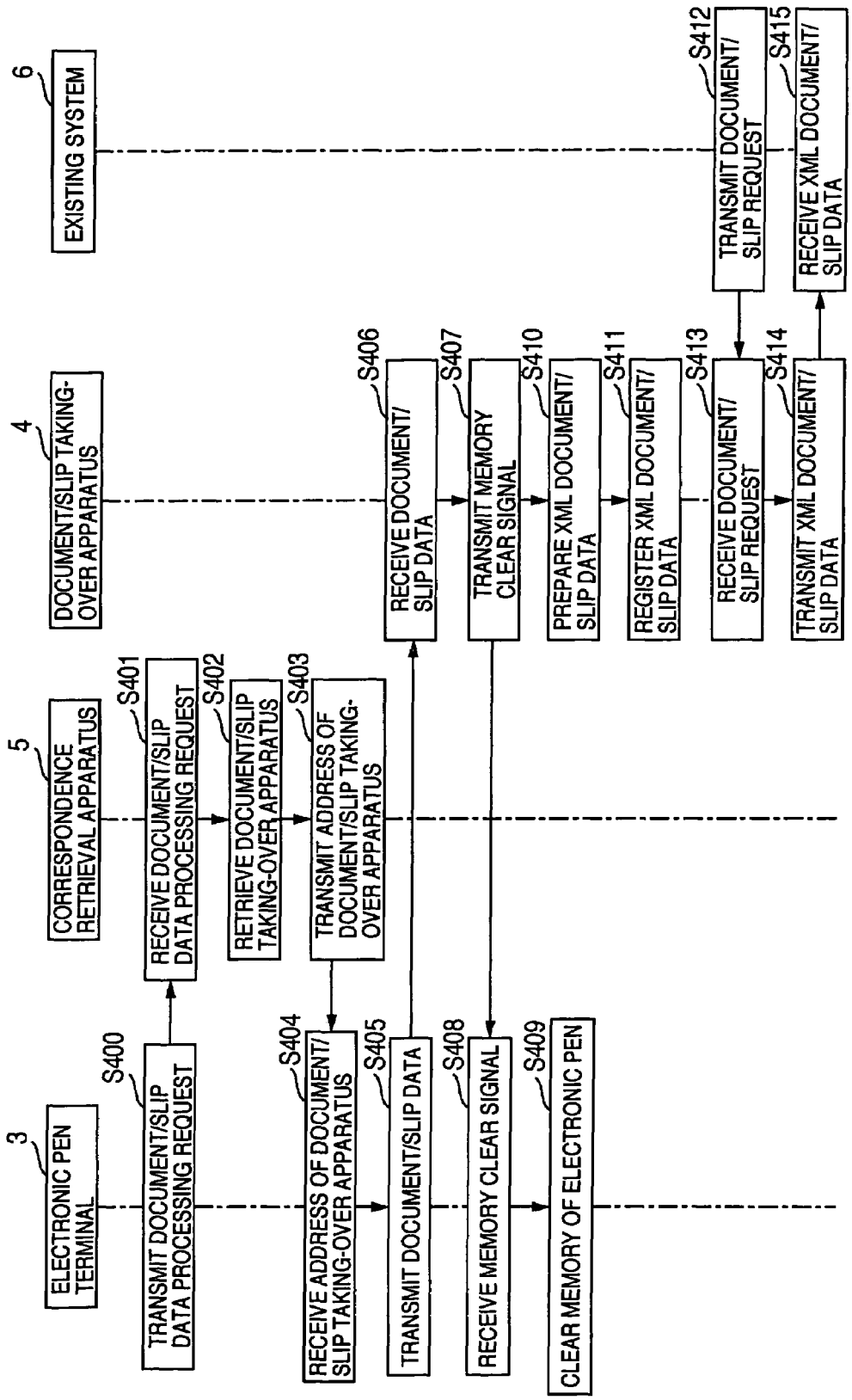

SYSTEM AND METHOD FOR TAKING OVER A DOCUMENT

BACKGROUND OF THE INVENTION

The present invention relates to a system for converting handwritten input information into electronic data and a method thereof, and more particularly to a document taking-over system and method for delivering the handwritten input information as the electronic data of a predetermined format to a system that utilizes the data.

Generally, an OCR (Optical Character Recognition) apparatus is used to convert input information handwritten on a document or slip into electronic data in order to process the data in computers or the like. In the OCR apparatus, a scanner is used to read characters handwritten on a document and recognize the read characters to thereby prepare or produce the electronic data. Such an OCR apparatus is defective in that an optical scanner is used to read characters and accordingly a recognition rate of characters is reduced when the layout in the document is complicated.

As a handwritten information input apparatus that solves such a defect, there is an apparatus using an electronic pen. For example, U.S. Pat. No. 6,570,104B1 discloses a handwritten information input apparatus using an electronic pen which can read a special dot pattern which is printed on a document and can specify a position and store the read pattern. The electronic pen of U.S. Pat. No. 6,570,104B1 includes a light emitting diode disposed in a cylindrical body thereof and which irradiates the surface of the document having the special dot pattern printed thereon with light emitted from the light emitting diode and an optical sensor which detects light reflected from the surface of the document to thereby read the dot pattern printed on the surface of the document and store it in a memory of the body. The stored data is analyzed to convert input information handwritten on the document into electronic data. According to the apparatus described in U.S. Pat. No. 6,570,104B1, even if the contents of the document are printed by a complicated layout, only characters written thereon can be converted into electronic data exactly.

However, when it is considered that the apparatus described in U.S. Pat. No. 6,570,104B1 is utilized in cooperation with an existing system such as a business system, the electronic data inputted by the apparatus has no attribute information as to what kind of contents is indicated by individual data contained in the electronic data and accordingly the electronic data cannot be utilized as it is.

SUMMARY OF THE INVENTION

Accordingly, it is an object of the present invention to provide an apparatus and method for processing electronic data inputted by means of such an electronic pen into electronic data of a predetermined format in a corresponding manner to layout information printed on a document and delivering it to an existing system.

In order to solve the above problem, according to the present invention, the document taking-over system comprises an electronic pen terminal provided with an electronic pen which gets information written by hand on a document prepared to be able to specify a kind thereof together with kind information of the document as electronic data and for transmitting the electronic data, a document taking-over apparatus for processing the electronic data to produce it as document information of a predetermined format such as XML (Extensible Markup Language) format, a correspondence retrieval apparatus for transmitting connection information to the document taking-over apparatus to the electronic pen terminal, and a system disposed at a latter stage to utilize the document information processed by the document taking-over apparatus, which are connected to one another through a network.

Further, the document taking-over method according to the present invention comprises a step of causing an electronic pen to get information written by hand on a document prepared to be able to specify a kind thereof together with kind information of the document as electronic data and causing an electronic pen terminal to obtain the electronic data from the electronic pen, a step of causing the electronic pen terminal to transmit the kind information of the document to a correspondence retrieval apparatus, a step of causing the correspondence retrieval apparatus to search memory means of the correspondence retrieval apparatus for connection information to the document taking-over apparatus for processing the electronic data while using the kind information as key information and transmitting the connection information to the terminal device, a step of causing the electronic pen terminal to transmit the electronic data to the document taking-over apparatus on the basis of the connection information, and a step of causing the document taking-over apparatus to process the electronic data received on the basis of the format information stored in memory means of the document taking-over apparatus into document data of XML format, for example, to register it in the memory means of the document taking-over means.

BRIEF DESCRIPTION OF THE DRAWINGS

FIG. 3 is a block diagram schematically illustrating a document or slip taking-over apparatus;

FIG. 4 is a diagram showing a document or slip definition picture;

FIG. 10 is a diagram showing a document correction picture;

FIG. 16 is a flow chart showing operation of delivering XML document or slip data to an existing system;

DETAILED DESCRIPTION OF THE EMBODIMENTS

Figure 1:
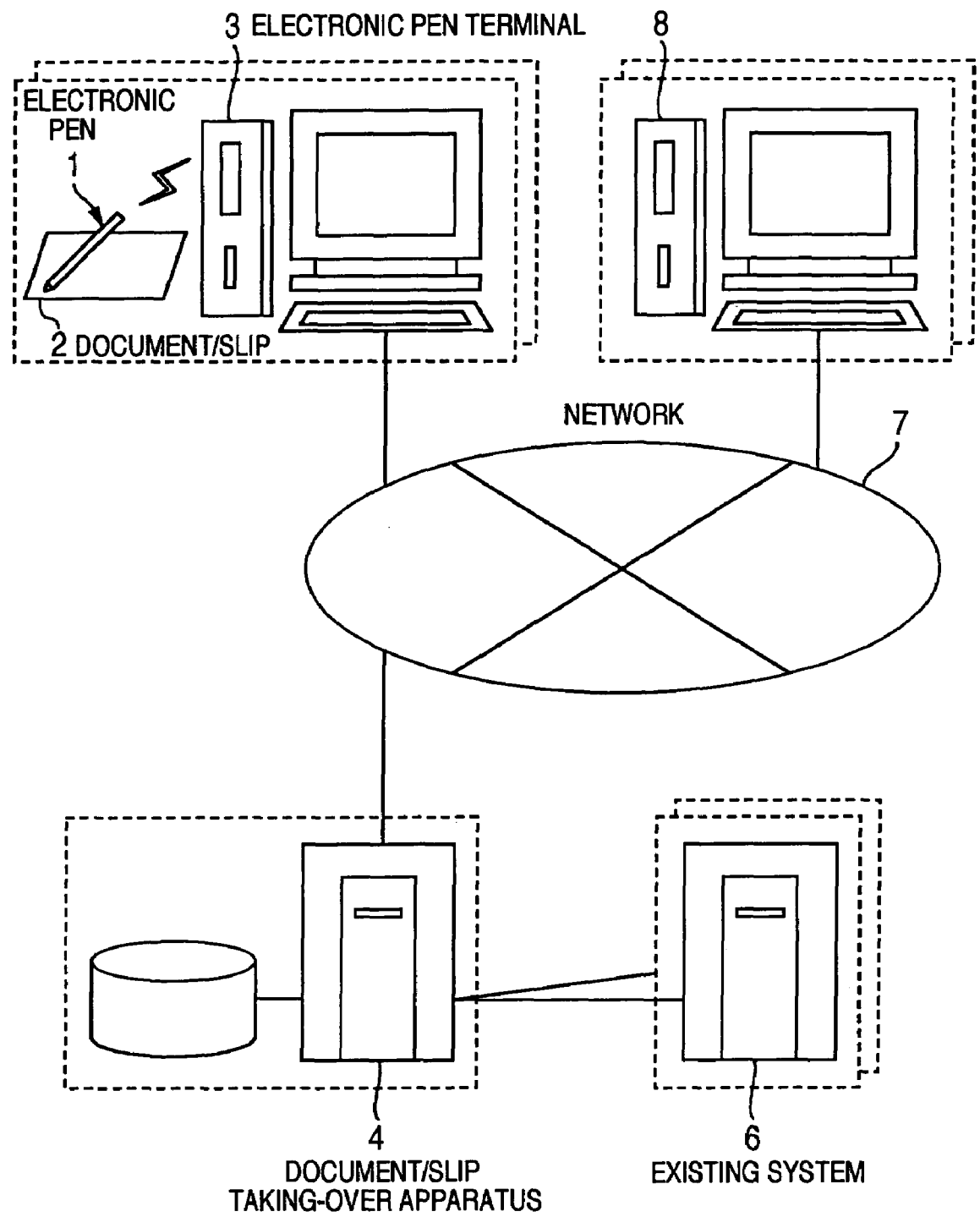
FIG. 1 is a block diagram schematically illustrating a document or slip taking-over system according to a first embodiment of the present invention.

Embodiments of the present invention are now described in detail with reference to the accompanying drawings. In the embodiments, a document or slip taking-over system and method are described in which information entered by means of an electronic pen on a document or slip which is a document on which special dot patterns are printed is analyzed to be processed or converted into electronic data and the electronic data is processed into data of XML format utilizable in an existing system disposed at the latter stage so that the electronic data is delivered to the existing system. In the drawings to which reference is made below, like reference numerals designate like constituent elements.

First Embodiment

The document or slip taking-over system of a first embodiment is now described. FIG. 1 is a schematic diagram illustrating the document or slip taking-over system of the embodiment. As shown in FIG. 1, the document or slip taking-over system of the embodiment includes an electronic pen terminal 3 including an electronic pen 1 used to input information to a document or slip 2, a document or slip taking-over apparatus 4 and a correction terminal 8, which are connected to one another by means of a network 7, and the document or slip taking-over system 4 is directly connected to an existing system disposed at the latter stage by means of a dedicated line or the like. Constituent elements constituting the document or slip taking-over system of the embodiment are now described in detail.

(Electronic Pen)

Figure 2:
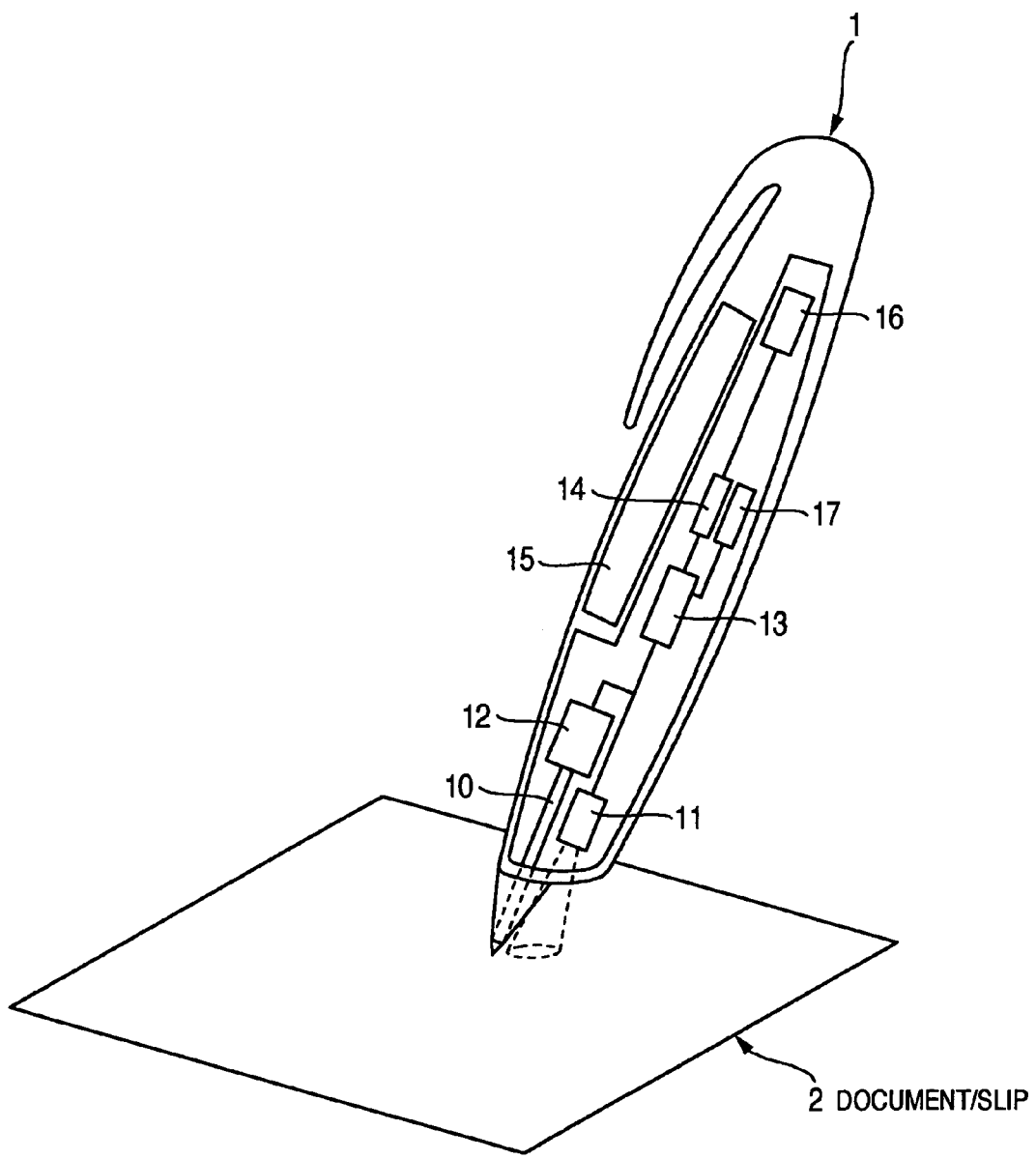
FIG. 2 is a perspective view showing an electronic pen.

FIG. 2 is a perspective view showing the electronic pen 1 used in the embodiment. As shown in FIG. 2, the electronic pen 1 includes a pen 10 constituting a writing member for entering necessary matters on a document or slip 2 on which special dot patterns are printed, a camera 11 for reading the dot patterns printed on the document or slip 2, a piezoelectric element 12 for detecting the writing pressure acting on the pen 10 upon entering, a processing unit 13 for processing data from the camera 11 and the piezoelectric element 12 and preparing stroke data which is information relating a position of a pen point moving with entering to the dot patterns, a memory 14 for storing the prepared stroke data and a transmission unit 16 for transmitting the position information to another apparatus. Further, the electronic pen 1 includes a display screen 15 for displaying input circumstances and input error and a vibration motor 17 for transmitting the input error to the user by vibration. The transmission unit 16 may be, for example, an apparatus for transmitting and receiving data in accordance with a communication protocol of the Bluetooth (registered trademark) which is a kind of the short-distance radio transmission technique by means of a radio wave having a predetermined frequency band, although it may be an apparatus for transmitting and receiving data in accordance with a communication protocol of other radio technique, radio LAN (Local Area Network) or cable communication technique. Further, the processing unit 13 is composed of CPU (Central Processing Unit), ROM (Read Only Memory) and electric and electronic circuits and controls the electronic pen 1 synthetically. More particularly, the processing unit 13 performs preparation and storing of the stroke data, addition of information such as a pen identification ID of the electronic pen 1, the transmission time and a page address which is an ID given to the document or slip 2 uniquely, transmission of document or slip data, control of the display screen 15 and the vibration motor 17 and the like. The document or slip data is information containing the stroke data, the pen identification ID, the transmission time, the page address and the like.

(Document or Slip)

The document or slip 2 in which data is entered by the electronic pen 1 functions as the electronic processing paper by printing the special dot patterns thereon. Peculiar dot patterns which can specify a page address for identifying the document or slip 2 are arranged in the document or slip 2. The dot patterns are arranged so that when the space of the document or slip is divided into a plurality of rectangular areas each having a predetermined size a position of each area can be specified, and a position on the document or slip 2 can be specified on the basis of the dot pattern. Further, document or slip print information is printed on the document or slip 2. The user of the document or slip taking-over system looks at the document or slip print information to identify entering contents, entering position and the like and can enter information in the document or slip 2. In addition, information entered in the document or slip 2 by the user of the document or slip taking-over system by means of the electronic pen 1 is converted into the stroke data which is position information of handwriting and stored in the memory 14 of the electronic pen 1.

(Electronic Pen Terminal)

Returning to FIG. 1, the electronic pen terminal 3 is described. The electronic pen terminal 3 is a terminal having the function of receiving document or slip data containing the stroke data sent from the electronic pen 1 by means of a radio receiving unit not shown and transmitting the data to the document or slip taking-over apparatus 4 through the network 7 and is typically realized by a personal computer.

(Document or Slip Taking-Over Apparatus)

The document or slip taking-over apparatus is composed of CPU, RAM (Random Access Memory), ROM, hard-disk drive and the like and is typically realized by a server computer connected to the network 7. The document or slip taking-over apparatus 4 has the function of receiving the document or slip data transmitted from the electronic pen terminal 3 through the network 7 and processing the document or slip data into data of XML format, for example, to deliver the data as XML document or slip data to the existing system 6. FIG. 3 is a block diagram schematically illustrating the document or slip taking-over apparatus 4. Referring now to FIG. 4, the document or slip taking-over apparatus 4 is described in detail. In the embodiment, the document or slip taking-over apparatus 4 processes the document or slip data into the data of XML format to output it, although the output format can be modified into any format in accordance with the requirement of the existing system disposed at the latter stage. For example, the document or slip data may be processed into image data or data of CSV (Comma Separated Value) format to be outputted.

As shown in FIG. 3, the document or slip taking-over apparatus 4 includes a first document or slip setting information database (DB) 20 storing a document or slip definition file in which specifications for processing the document or slip data into the data of XML format are defined, system setting information in which the document or slip 2 delivered by the document or slip taking-over apparatus 4 and the existing system 6 to which the document or slip 2 is delivered are defined, the dot pattern of the document or slip and document or slip space information described later, a document or slip information database (DB) 21 storing XML document or slip data which is processed data delivered to the existing system 6 and extracted from the document or slip data into XML format, a temporary information database (DB) 22 which temporarily stores the document or slip data and image data taken out for the recognition of characters, a character recognition unit 23 for recognizing characters and selection item of the document or slip data on the basis of the document or slip definition file, a preparation unit 24 for preparing XML document or slip data and document or slip image described later, a registration unit 25 for registering the prepared XML document or slip data in the document or slip information database 21 and a communication unit 26 for making communication through the network 7. These units 23, 24 and 25 can be controlled by a software.

Further, the document or slip space information is information relating the dot pattern of the document or slip to the document or slip print information in each page address of the document or slip 2 and is managed by the document or slip taking-over apparatus 4 in the embodiment, although it is considered that the document or slip space information is managed by another server apparatus unitarily. The document or slip taking-over apparatus 4 of the embodiment includes the character recognition unit 23, although the function of the character recognition unit 23 may be dispersedly provided in another server apparatus connected to the network 7. The document or slip definition file, information contained in the system setting information and a setting method thereof will be described in detail later. The above units of the document or slip taking-over apparatus 4 and the function thereof are realized by developing program codes stored in a hard-disk drive of the document or slip taking-over apparatus 4 into the RAM and executing the program codes developed in the RAM.

(Existing System)

The existing system 6 is disposed at the latter stage and is considered to be, for example, a business system which receives the XML document or slip data. In the embodiment, the existing system 6 is connected through a dedicated line to the document or slip apparatus 4 which prepares the XML document or slip data. The existing system 6 transmits a document or slip request to the document or slip taking-over apparatus 4 through the dedicated line and when the XML document or slip data which is not transmitted to the existing system 6 is stored in the document or slip information database 21 of the document or slip taking-over apparatus 4 shown in FIG. 3 the existing system 6 receives the XML document or slip data to subject it to predetermined processing.

Further, in the embodiment, it is supposed that the existing system 6 is the business system connected through the dedicated line, although it is a matter of course that the existing system 6 may be a newly introduced system or the existing system 6 is not limited to the business system and may be a facsimile or a printer. Further, the connection method is not limited to the connection using the dedicated line and the existing system 6 may be connected to the document or slip taking-over system 4 through the network 7 or the XML document or slip data may be transmitted as a electronic mail to the existing system 6.

(Correction Terminal)

The correction terminal 8 is a terminal having the communication function of correcting the XML document or slip data processed by the document or slip apparatus 4 before the XML document or slip data is delivered to the existing system 6 and inputting the document or slip definition file and the system setting information and is typically realized by a personal computer. The method of correcting the XML document or slip data by the correction terminal 8 will be described in detail later. In the embodiment, correction of the XML document or slip data is made by the dedicated correction terminal 8, although the XML document or slip data may be corrected by the electric pen terminal 3 or the document or slip taking-over apparatus 4 may be provided with a display unit and an input unit such as a keyboard to correct the XML document or slip data in the document or slip taking-over apparatus 4 by using the display unit and the input unit.

Next, the document or slip taking-over method using the document or slip taking-over system of the embodiment is described in which the document or slip data entered in the document or slip 2 by the user of the document or slip taking-over system by means of the electronic pen 1 is processed into the XML document or slip data utilizable in the existing system 6 and delivered to the existing system 6.

(Setting of Document or Slip Definition File)

First, on the assumption that the document or slip taking-over system of the embodiment is utilized, it is necessary to make setting of the document or slip taking-over apparatus 4 for processing the document or slip data and setting of specifications for processing of stroke data entered in the document or slip 2 into data of XML format and the like. In the document or slip taking-over system of the embodiment, it is supposed that the manager of the document or slip taking-over system, for example, accesses to the document or slip taking-over apparatus 4 from the correction terminal 8 through the network 7 and makes the settings. FIG. 4 is a diagram showing a document or slip definition picture 35 for setting specifications for processing of stroke data entered in the document or slip 2 into data of XML format. The document or slip definition picture 35 includes a document or slip display area 48 positioned on the left side thereof for displaying the document or slip 2 to which specifications for processing into data of XML format are set and a detail setting area positioned on the right side thereof. The detail setting area includes a page address entering column 36 for indicating a page address of the document or slip 2, a file name entering column 37 for entering a name of the document or slip definition file in which information set in the document or slip definition picture 35 is stored, an area ID display column 38 for displaying an area ID given uniquely to individual entering area described later, an area name entering column 39 for entering a name of the entering area, an entering indispensable selection column 40 for selectively deciding whether entering in the entering area is indispensable or not, a transfer selection column 41 for selectively deciding whether information entered in the entering area is transferred to the existing system or not, an attribute selection column 42 for selectively deciding whether the information entered in the entering area is character information, selection item information or image information, a character recognition selection column 43 for selectively deciding which of character recognition and selection item recognition is made when the character information or the selection item information is selected in the attribute selection column 42, a maximum character number entering column 44 for setting the maximum number of characters entered in the entering area, an enterable line number entering column 45 for setting the number of lines enterable in the entering area, an outer frame selection column 46 for selectively deciding whether the entering area is that containing the selection item or not when the entering area contains the selection item, and a maximum selection value entering column 47 for setting a maximum selectable number when the entering area containing the selection item is selected in the outer frame selection column 46. Further, a "registration" button 49 for registering the set information in the document or slip definition file, a "next" button 50 selectively operated when a next input area is set and a "end" button 51 selectively operated when the setting is ended are arranged in the lower right portion of the document or slip definition picture 35.

Next, the input method of the document or slip definition information is described with reference to the document or slip definition picture 35 shown in FIG. 4. First, the manager of the document or slip taking-over system inputs a page address of a document or slip 2 which he wishes to define into the page address entering column 36. The document or slip taking-over apparatus 4 searches the document or slip information database 21 for the document or slip space data relevant to the page address, so that the document or slip 2 relevant to the page address inputted in the page address entering column 36 is displayed in the document or slip display area 48. In this connection, the Written Demand of Opening of Official Document which is a document or slip for demanding the opening of the official document is shown in the document or slip display area 48 by way of example. Next, the manager uses an input unit such as a mouse to individually designate areas that the document or slip taking-over apparatus 4 is caused to subject to character recognition or selection item recognition from among the entering columns of the document or slip 2 displayed in the document or slip display area 48. The entering areas are decided by this operation. The decided entering areas are displayed as areas enclosed by broken line as shown in the document or slip display area 48 of FIG. 4. Next, detail setting is made for each of the decided entering areas.

The document or slip definition picture 35 shown in FIG. 4 shows an example in which setting into the entering area for "family name" of the name entering column indicated by solid line is made by selecting it by means of the mouse or like from the entering areas shown by broken line in the document or slip display area 48. The area ID is automatically assigned in order from the left upper portion, for example, when the entering area is decided. In this example, "001" is assigned to the entering area of "family name" shown by solid line. When the manager of the document or slip taking-over system selects this entering area, the area is displayed by solid line instead of broken line and "001" which is the area ID of this entering area is displayed in the area ID display column 38. Then, the manager inputs "family name" into the area name entering column 39 and since this information is an indispensably entering item, the check mark is inputted into the check box for "Yes" of the entering indispensable selection column 40. Since it is indicated that this information is transmitted to the existing system, the check mark is inputted into the check box for "Yes" of the transfer selection column 41 and since this information is character information, the check mark is inputted into the check box for "character" of the attribute selection column 42. Further, the manager inputs the check mark into the check box for "Yes" of the character recognition selection column 43 in order to make character recognition of this information. "10" is inputted into the maximum character number entering column 44 in order to set the maximum number of characters to be inputted into this entering area to be 10. "1" is inputted into the maximum line number entering column 45 in order to set the maximum number of lines to be inputted in this entering area to be 1. Since this entering column is not the column for selecting a plurality of items, the check mark is inputted into the check box for "no presence" of the outer frame selection column 46. Since the "no presence" is inputted in the outer frame selection column 46, any numerical value is not inputted in the maximum selection value entering column 47. The manager inputs the above setting items to thereby end the detail setting for the entering areas to which the "family name" is inputted.

The manager of the document or slip taking-over system makes setting into all of the entering areas in the above-mentioned manner and when the setting into all of the entering areas is ended, the document or slip taking-over apparatus 4 registers the setting information for the entering areas as the document or slip definition file into the first document or slip setting information database 20 of the document or slip taking-over apparatus 4 shown in FIG. 3.

(Registration of System Setting Information)

Figure 5:
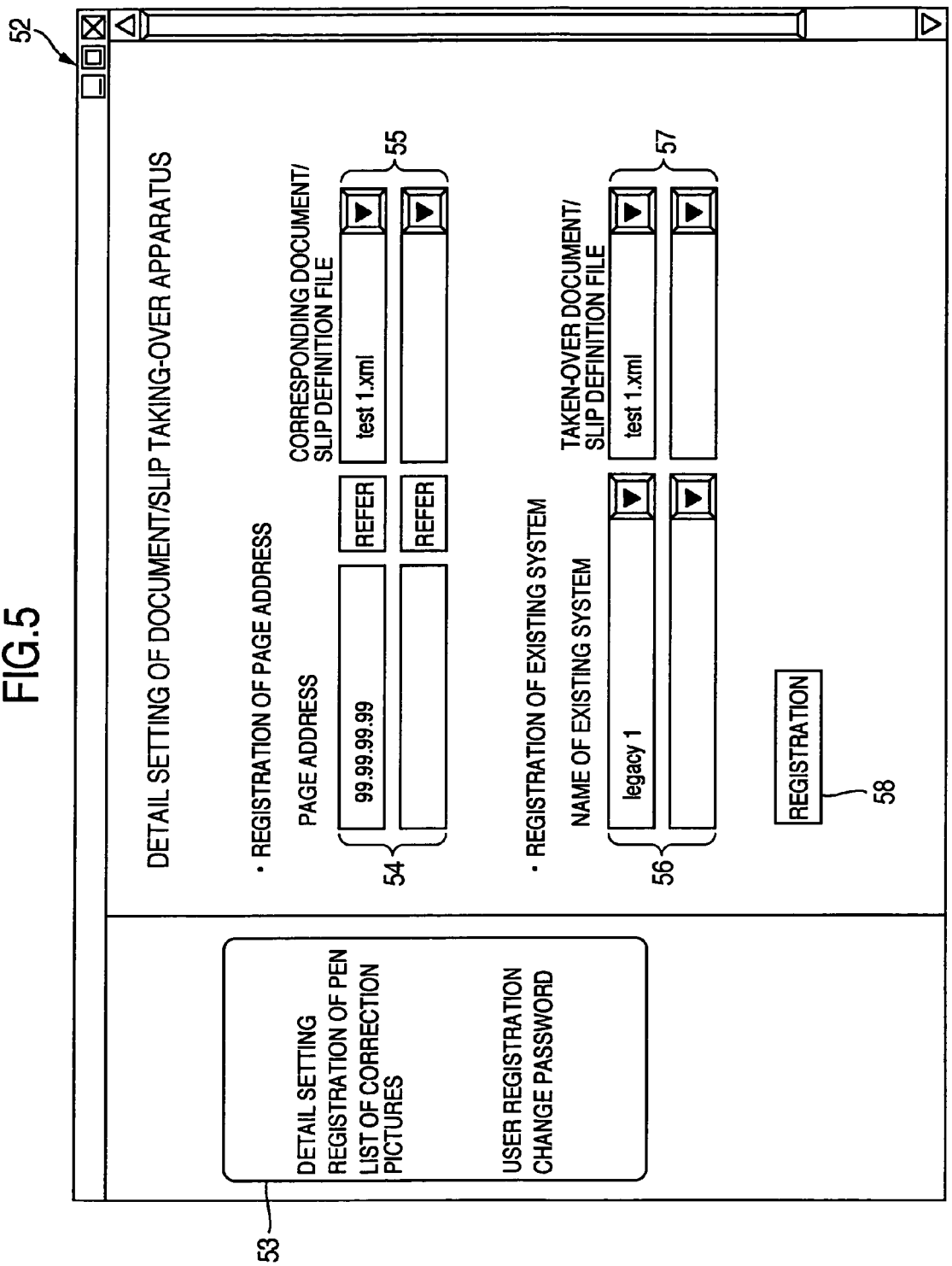
FIG. 5 is a diagram showing a detail setting picture of the document or slip taking-over apparatus.

The operation that the manager of the document or slip taking-over system inputs the system setting information containing the correspondence information of the document or slip 2 and the document or slip taking-over apparatus 4 is next described. The manager first accesses to the document or slip taking-over apparatus 4 from the correction terminal 9 in order to input the system setting information. FIG. 5 shows a detail setting picture 52 of the document or slip taking-over apparatus displayed in the correction terminal 8 when the manager accesses to the document or slip taking-over apparatus 4. The document or slip taking-over apparatus detail setting picture 52 of FIG. 5 includes a menu area 53 selected in order to move to another setting picture, a page address entering column 54 for inputting a page address of a document or slip processed by the document or slip taking-over apparatus 4, a corresponding document or slip definition file selection column 55 for selecting a document or slip definition file corresponding to the document or slip of the page address, an existing system selection column 56 for selecting an existing system 6 to which the document or slip taking-over apparatus 4 delivers data, from among the existing systems connected to the document or slip taking-over apparatus 4 through the dedicated line, a taken-over document or slip definition file selection column 57 for selecting a document or slip definition file in which specifications of the XML document or slip file to be delivered to the existing system selected in the existing system selection column 56 is defined, and a "registration" button 58 selected when the above-set information is registered. The manager sets the existing system 6 to which the document or slip taking-over apparatus 4 delivers XML document or slip data by using the above picture. The document or slip taking-over apparatus 4 registers the information set in the document or slip taking-over apparatus detail setting picture 52 as the system setting information to the first document or slip setting information database 20 of the document or slip taking-over apparatus 4 shown in FIG. 3.

Figure 6:
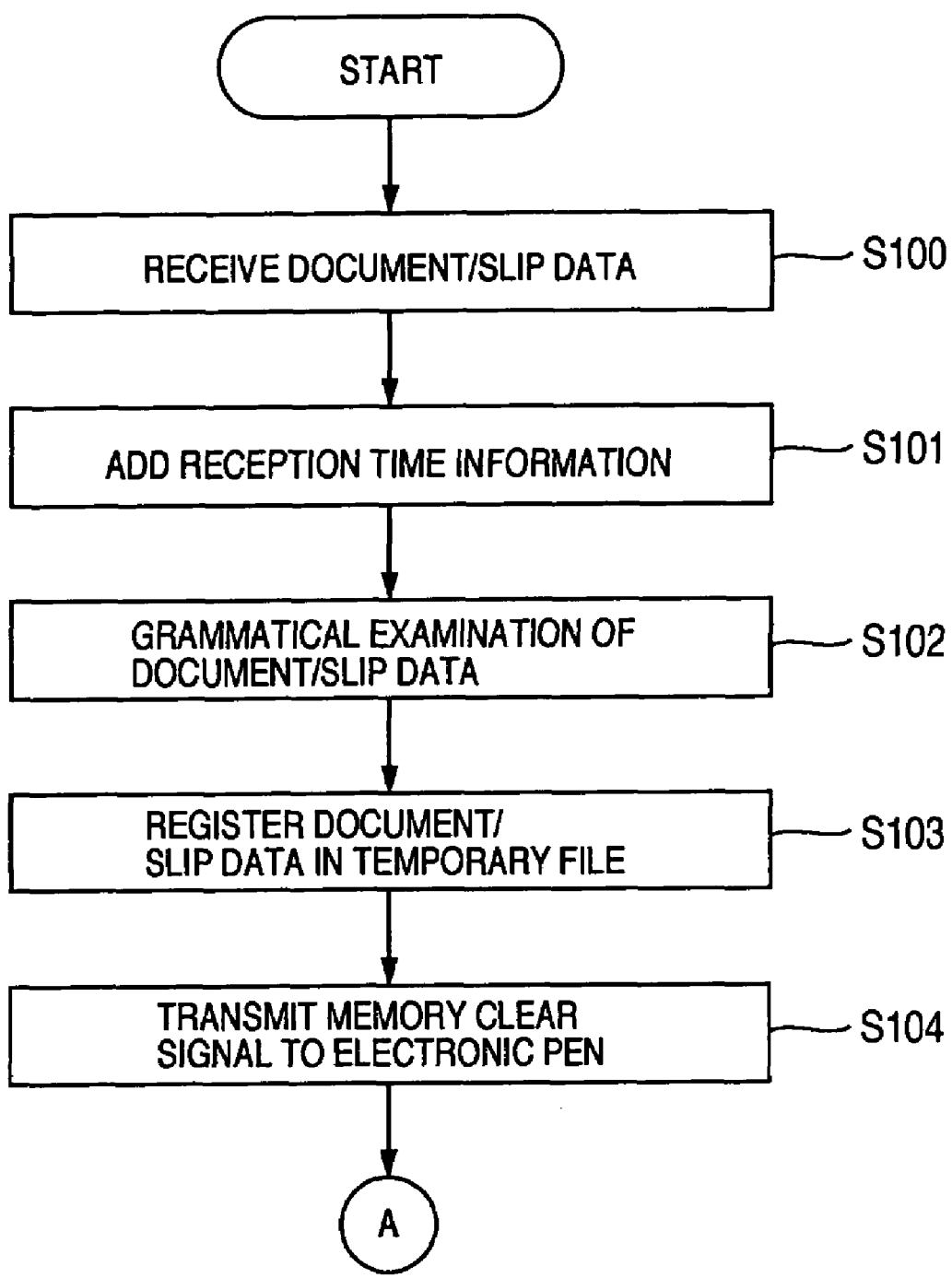
FIG. 6 is a flow chart showing receiving operation of document or slip data.
Figure 7:
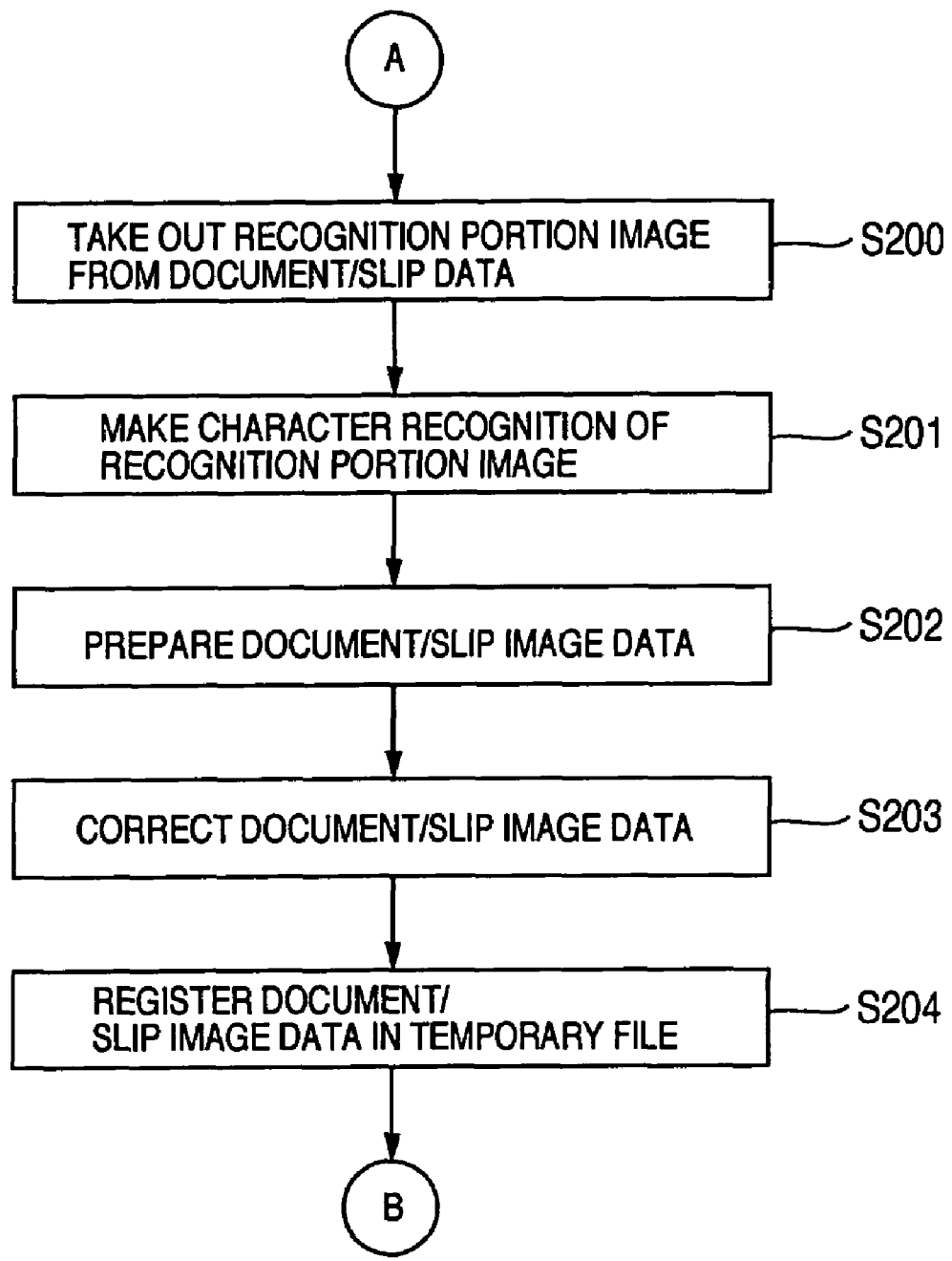
FIG. 7 is a flow chart showing processing of document or slip data.
Figure 8:
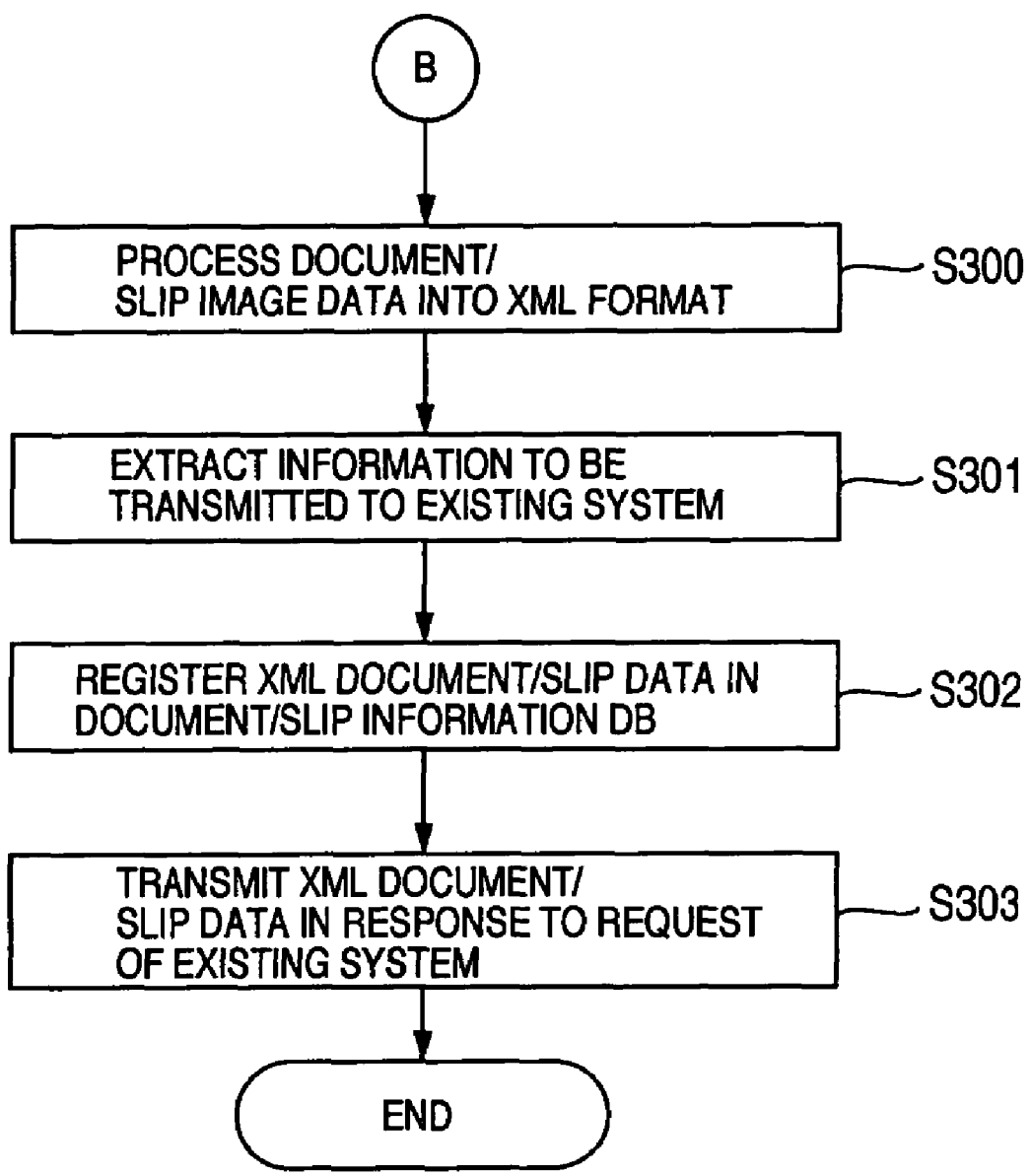
FIG. 8 is a flow chart showing delivery operation to an existing system.

FIGS. 6 to 8 are flow charts showing operation of receiving document or slip data from the electronic pen terminal 3 and delivering the data to the existing system 6. Referring now to FIGS. 6 to 8, operation of processing the document or slip data received from the electronic pen terminal 3 into XML document or slip data of XML format by the document or slip taking-over system 4 and delivering the XML document or slip data to the existing system 6 by using the document or slip taking-over system in which setting of the document or slip definition file and the system setting information is ended is described.

(Reception of Document or Slip Data)

FIG. 6 is a flow chart showing operation of the document or slip taking-out apparatus 4 which receives document or slip data from the electronic pen terminal 3 and transmits a memory clear signal of the electronic pen 1. Referring now to the flow chart of FIG. 6, the operation performed until the document or slip taking-over apparatus 4 transmits the memory clear information of the electronic pen 1 is described in detail (refer to FIGS. 1 to 3).

The user of the document or slip taking-over system of the embodiment uses the electronic pen 1 to enter necessary matters in the document or slip 2. The electronic pen 1 adds information such as the identification ID of the electronic pen, the transmission time, the page address for identifying the document or slip 2 to the stroke data entered by the user of the electronic pen and transmits it as the document or slip data to the electronic pen terminal 3. The electronic pen terminal 3 which has received the document or slip data transmits the received document or slip data to the document or slip taking-over apparatus 4. When the document or slip taking-over apparatus 4 receives the document or slip data transmitted from the electronic pen terminal 3 (step S100), the apparatus 4 adds the reception time information to the document or slip data (step S101). The document or slip taking-over apparatus makes grammatical examination of the document or slip data for examining whether any pen stroke is present in the entering area in which the check mark is entered in "Yes" in the entering indispensable selection column 40 of the document or slip definition picture 35 shown in FIG. 4 or not (step S102). Further, in step S102, when there is no pen stroke in the entering area of the entering indispensable selection column, the document or slip taking-over apparatus 4 may display an alarm in the display screen 15 of the electronic pen 1 or may operate the vibration motor 17 of the electronic pen 1 to produce an alarm to the user.

In step S102, when there is no problem, for example when there is no pen stroke in the entering dispensable area and so on, the document or slip data added with the reception time in step S101 is registered as a temporary file in a document or slip temporary file contained in the temporary information database 22 of the document or slip taking-over apparatus 4 shown in FIG. 3 (step S103). When the registration of the document or slip data in the document or slip temporary file is ended, the document or slip taking-over apparatus 4 transmits the memory clear signal for clearing the memory 14 of the electronic pen 1 to the electronic pen terminal 3 (step S104). When the electronic pen terminal 3 receives the memory clear signal, the memory clear signal is transmitted to the electronic pen 1 to thereby clear the memory 14 of the electronic pen 1. Further, when the memory 14 of the electronic pen 1 is cleared, the message that transmission of the document or slip data is successful may be displayed in the display screen 15 of the electronic pen 1. In addition, the electronic pen 1 may be previously registered in the system setting information before step S100 that the document or slip data is received to thereby include the procedure of authentication of the electronic pen 1. As described above, the reception processing of the document or slip data is ended.

(Processing of Document or Slip)

FIG. 7 is a flow chart showing operation of taking out the recognition portion from the entered document or slip data and registering document or slip image data. Referring now to the flow chart shown in FIG. 7, the operation performed until the document or slip image data is registered is described in detail (refer to FIGS. 1 and 3). First, the document or slip taking-over apparatus 4 produces an image of the stroke data in the entering area registered as character recognition, selection item recognition or picture from the document or slip data registered in the document or slip temporary file in accordance with the entering area defined in the document or slip definition file and takes out the portion to be character-recognized or selection-item-recognized as recognition portion image and the portion to be registered as picture as picture image (step S200). The taken-out recognition portion image or picture image is registered in a recognition temporary file contained in the temporary information database 22. The character recognition unit 23 makes character recognition or selection item recognition of the recognition portion image in accordance with setting of the document-or slip definition file (step S201) and the preparation unit 24 combines the recognized result, the picture image and the document or slip print information contained in the document or slip space information stored in the first document or slip setting information database 20 to prepare the document or slip image data (step S202). The document or slip image data is registered in a document or slip image temporary file stored in the temporary information database 22. The preparation unit 24 of the document or slip taking-over apparatus 4 prepares a document or slip correction picture for confirming whether there is any error in the document or slip image data or not and transmits the document or slip correction picture to the correction terminal 8, for example, so that the manager of the document or slip taking-out system can correct the document or slip image data (step S203). The format of the image data can use PNG (Portable Network Graphics) format or BMP (Bit Map) format.

Figure 9:
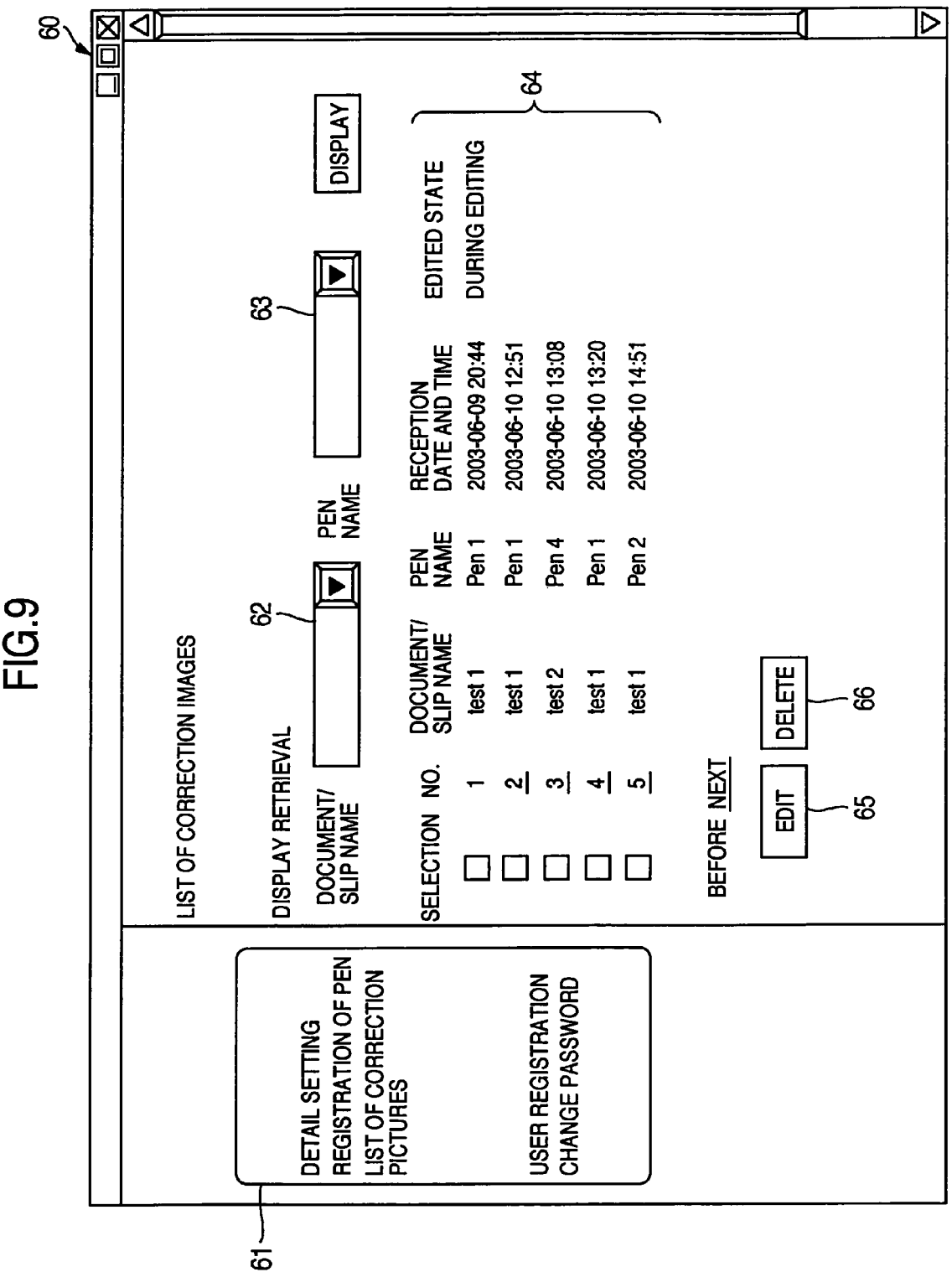
FIG. 9 is a diagram showing a list-of-correction-images picture.

FIG. 9 shows a list-of-correction-images picture 60 in which a list of document or slip image data registered in the document or slip image temporary file of the document or slip taking-out apparatus 4 is displayed. The list-of-correction-images picture 60 is displayed in the correction terminal 8 when the document or slip taking-over apparatus 4 is accessed and displays a list of document or slip image data preserved in the document or slip taking-out apparatus 4 at this time. The list-of-correction-images picture 60 includes a menu area 61 selected in order to move another setting picture, a document or slip name entering column 62 in which, when a document or slip to be corrected is searched for, the document or slip definition file name thereof is entered, a pen name entering column 63 in which a pen name is entered when the document or slip image data to be corrected is searched for while using the ID of the pen entered in the document or slip as key information, a document or slip selection area 64 in which a list of document or slip image data registered in the document or slip image temporary file is displayed, an "edit" button 65 which is selectively operated to edit the selected document or slip image data, and a "delete" button 66 for deleting the selected document or slip image data.

The manager of the document or slip taking-out system uses the list-of-correction-images picture 60 to select a desired document or slip correction picture described later. The manager selects a desired document or slip correction picture by the operation of inputting the document or slip definition file name into the document or slip name entering column and selecting a "display" button or by the operation of inputting the ID of the pen entered in the document or slip into the pen name entering column 63 and selecting the "display" button and enters the check mark in the check box of the document or slip image data that he wishes to correct from the list of document or slip image data displayed in the document or slip selection area 64 and then operates the "edit" button. The display picture is changed to the document or slip correction picture for correcting the individual document or slip image data in response to the operation. Further, when there is unnecessary document or slip image data, the document or slip image data can be deleted by the operation of entering the check mark in the check box of the document or slip image data and operating the "delete" button 66. The document or slip image data having "during editing" being displayed in the document or slip selection area 64 represents that it is being corrected in another correction terminal. In this case, exclusive control is made to prevent correction operation by the correction terminal 8. In this case, only reading or perusal may be made.

FIG. 10 shows the document or slip correction picture 70. The document or slip correction picture 70 includes a document or slip image area 71 reproduced from the stroke data displayed on the left side of the picture, a document or slip correction area in which the stroke data inputted in the entering area displayed on the right side of the picture and the recognized results are displayed together, an "OK" button 76 selected upon completion of the correction, and a "cancel" button 77 for ending the correction on the way thereof.

A family name confirmation area 72, a given name confirmation area 73 and an address confirmation area 74 contained in the document or slip correction area of the document or slip correction picture 70 shown in FIG. 10 are areas for confirming the character recognition results. The manager or the user can confirm whether the entering characters are recognized exactly and when there is a portion that he wishes to correct, the portion to be corrected is selected by the mouse or the like and can be corrected by means of the keyboard. Further, a demandant classification confirmation area 75 is an area for confirming the selection item recognition result. The manager or the user can confirm whether the checked items are recognized exactly and when there is a portion that he wishes to correct, the portion can be corrected similarly.

When the document or slip correction picture 70 is utilized to complete the correction of the document or slip image data, the manager or the user selects the "OK" button 76. The document or slip taking-over apparatus 4 registers the document or slip image data in the document or slip image temporary file in response to the selection of the "OK" button again (step S204). The document or slip image data is prepared by the foregoing operation.

(Cooperation with Existing System)

FIG. 8 is a flow chart showing operation of processing the document or slip image to which data has been inputted, into XML document or slip data and transmitting the XML document or slip data. The operation performed until the XML document or slip data is transmitted is now described in detail with reference to the flow chart shown in FIG. 8 (refer to FIGS. 1 and 3). The document or slip taking-over apparatus 4 first processes the document or slip image data registered in the document or slip image temporary file into the XML format (step S300) and extracts the item having the check mark entered in "Yes" in the transfer information selection area 41 of the document or slip definition picture 35 from the document or slip image data processed into the XML format (step S301). The document or slip taking-over apparatus 4 registers the extracted document or slip data processed into the XML format as the XML document or slip data in the document or slip information database 21 (step S302). When a document or slip request for requiring the XML document or slip data is transmitted from the existing system 6, the XML document or slip data is transmitted to the existing system 6 (step S303). The transmission processing of the XML document or slip data is completed as described above. In the embodiment, the XML document or slip data is of the pull type that the data is transmitted to the existing system 6 in response to a request of the existing system 6, although the XML document or slip data may be of the push type that the document or slip taking-over apparatus 4 transmits the XML document or slip data to the existing system 6 when the XML document or slip data is registered or at a predetermined time or the like. Further, in step S301, the information delivered to the existing system 6 is extracted, although the extraction process may be omitted and all information may be delivered to the existing system 6. In this case, the existing system 6 extracts necessary information.

Second Embodiment

Figure 11:
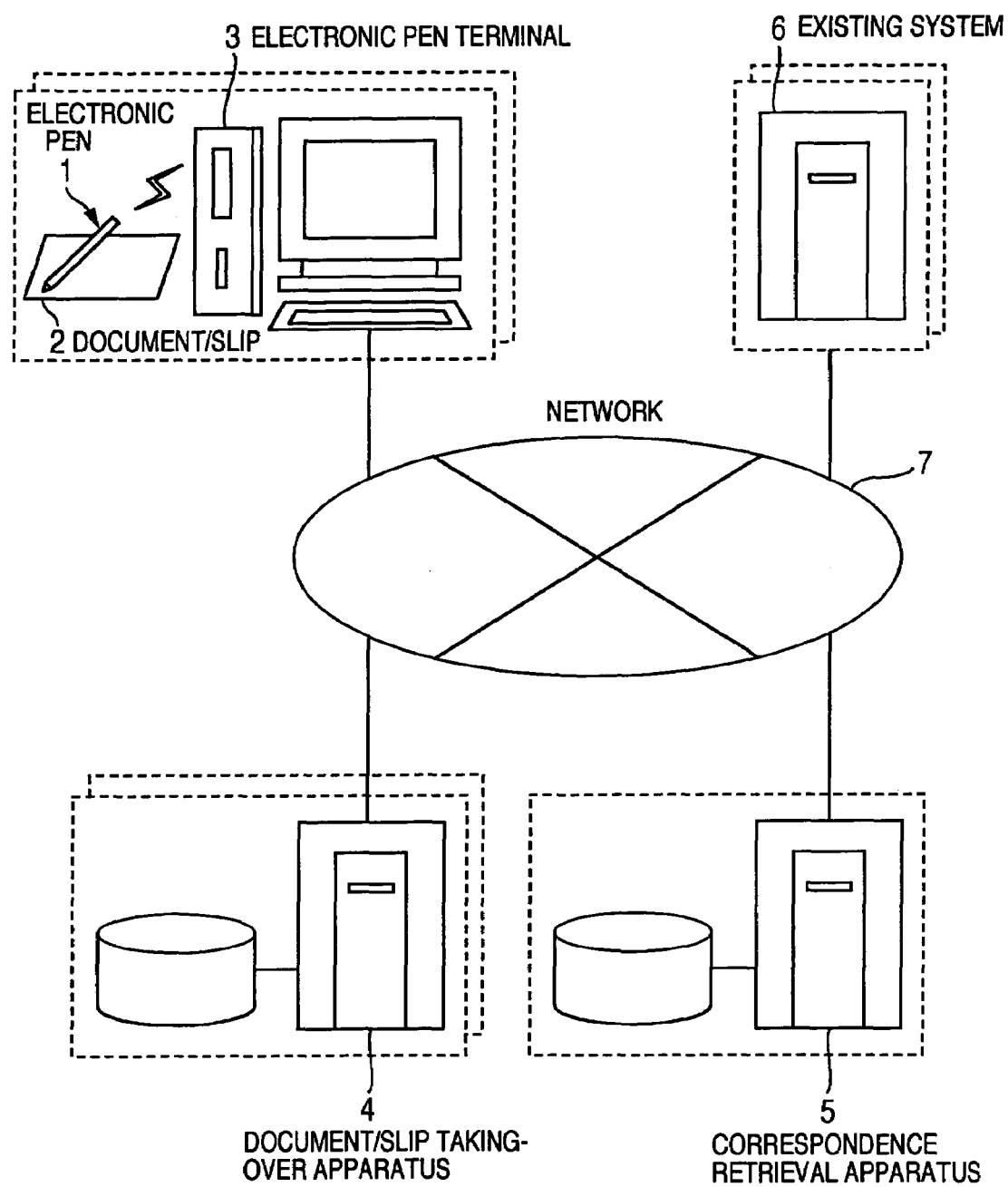
FIG. 11 is a block diagram schematically illustrating a document or slip taking-over system according to a second embodiment of the present invention.

A document or slip taking-over system of a second embodiment is now described. FIG. 11 schematically illustrates the document or slip taking-over system of the second embodiment. As shown in FIG. 11, the document or slip taking-over system of the embodiment comprises a plurality of electronic pen terminals 3 each having an electronic pen 1 used to input information written by hand on a document or slip 2, a plurality of document or slip taking-over apparatuses 4, a correspondence retrieval apparatus 5, and a plurality of existing systems disposed at the latter stage, which are connected to one another through a network 7. The electronic pen 1, the document or slip 2, the electronic pen terminals 3, the document or slip taking-over apparatuses 4, the existing systems 6 and the network 7 are substantially identical with those of the first embodiment and accordingly detailed description thereof is omitted. However, different points in operation from that of each constituent element of the document or slip taking-over system of the first embodiment are described in subsequent description each time it happens.

(Correspondence Retrieval Apparatus)

Figure 12:
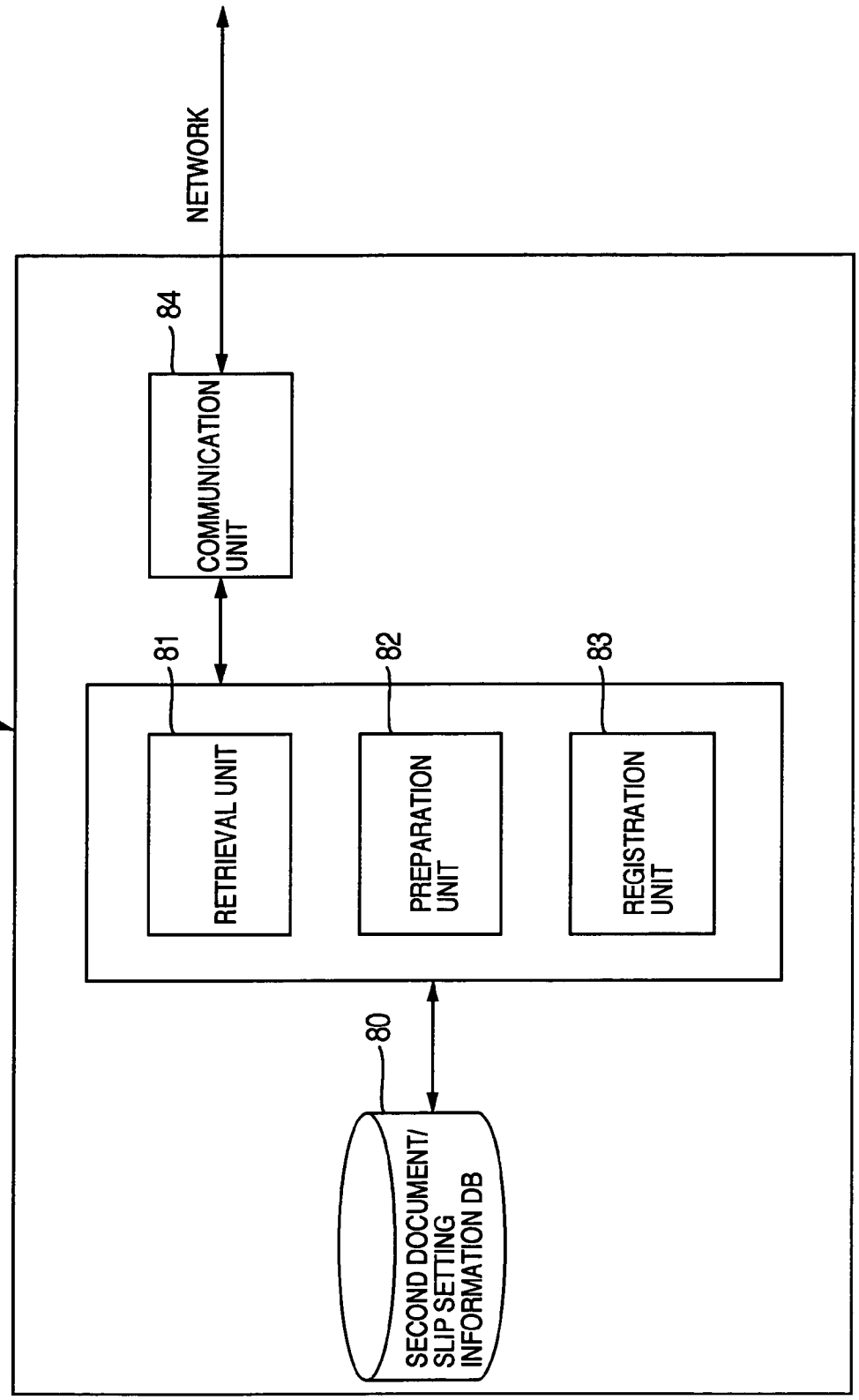
FIG. 12 is a block diagram schematically illustrating a correspondence retrieval apparatus.

The correspondence retrieval apparatus 5 includes CPU, RAM, ROM and hard-disk drive and is typically realized by a server computer connected to the network 7. FIG. 12 is a block diagram schematically illustrating the correspondence retrieval apparatus 5. As shown in FIG. 12, the correspondence retrieval apparatus 5 includes a second document or slip setting information database (DB) 80 for storing system setting information which defines the document or slip 2 delivered by the document or slip taking-over apparatus 4 and the existing system which is a delivery destination of the document or slip 2, document or slip space information and the like, a retrieval unit 81 for retrieving or searching for correspondence of the document or slip 2 and the document or slip taking-over apparatus 4, a preparation unit 82 for preparing an input picture of the system setting information and the like, a registration unit 83 for registering an inputted correspondence table in the second document or slip setting information database 80 and a communication unit 84 for making communication through the network 7. These units 81, 82 and 83 can be controlled by a software.

The second document or slip setting information database 80 is formed in a storage apparatus such as a hard-disk drive of the correspondence retrieval apparatus 5 and page addresses for identifying the document or slip in each document or slip taking-over apparatus are registered or set in the system setting information stored in the second document or slip setting information database 80 in a corresponding manner to the document or slip taking-over apparatus. The correspondence retrieval apparatus 5 has the function responsive to a processing request containing a page address transmitted from the electronic pen terminal 3 to retrieve an address of the document or slip taking-over apparatus 4 corresponding to the page address by the retrieval unit 81 and transmit it to the electronic pen terminal 3 and the function of setting the system setting information and the like received through the network 7. The information contained in the system setting information set by the setting function and the setting method thereof will be described later in detail. The units and the function of the correspondence retrieval apparatus 5 are realized by developing program codes stored in a hard-disk drive of the correspondence retrieval apparatus 5 into the RAM and executing the program codes developed in the RAM.

The document or slip taking-over method performed by the document or slip taking-over system of the embodiment for processing the document or slip data entered in the document or slip 2 by the user of the document or slip taking-over system by means of the electronic pen 1 into XML document or slip data utilizable in the existing system 6 and delivering it to the existing system is now described.

First, on the assumption that the document or slip taking-over system of the embodiment is utilized, it is necessary to previously input the document or slip definition file and the system setting information in the same manner as the first embodiment. In the first embodiment, the manager of the document or slip taking-over system accesses to the document or slip taking-over apparatus 4 from the correction terminal 8 to make the setting, although in the document or slip taking-over system of the second embodiment the manager of the document or slip taking-over system accesses to the document or slip taking-over apparatus 4 from the electronic pen terminal 3 through the network 7 to input the document or slip definition file and accesses to the correspondence retrieval apparatus 5 to input the system setting information.

(Setting of Document or Slip Definition File)

As described above, in the embodiment, the setting of the document or slip definition file is made in the document or slip taking-over apparatus 4 from the electronic pen terminal 3 through the network 7 and the input picture thereof is the same as the document or slip definition picture 35 of FIG. 4 described in the first embodiment. The input method thereof is also the same and accordingly description thereof is omitted.

(Registration of Document or Slip Taking-Over Apparatus)

Figure 13:
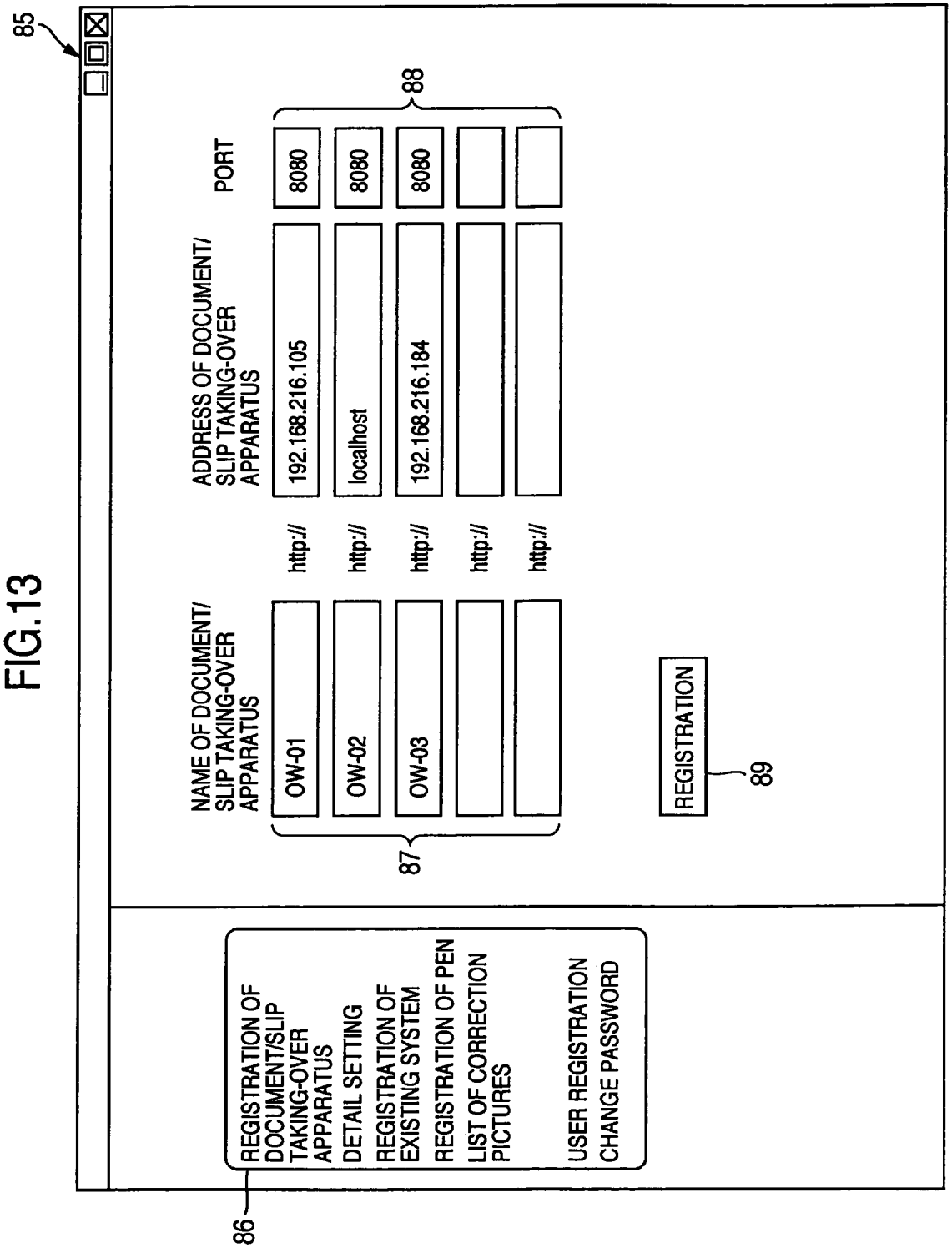
FIG. 13 is a diagram showing a registration picture of document or slip taking-over apparatuses.

Operation of inputting the system setting information containing the correspondence information of the document or slip 2 and the document or slip taking-over apparatus 4 is now described. First, the manager of the document or slip taking-over system of the embodiment accesses to the correspondence retrieval apparatus 5 from the electronic pen terminal 3 so as to input the system setting information. FIG. 13 shows a registration picture 85 of the document or slip taking-over apparatus displayed in the electronic pen terminal 3 when the manager accesses to the correspondence retrieval apparatus 5. The document or slip taking-over apparatus registration picture 85 includes a menu area 86 selected in order to move another setting picture, a name-of-document or slip-taking-over-apparatus entering column 87 for entering names of the document or slip taking-over apparatuses to be registered, an address-of-document or slip-taking-over-apparatus entering column 88 for entering addresses and port numbers of the document or slip taking-over apparatuses to be registered, and a registration button 89 for registering the entered information. The manager uses this picture to input the names of the document or slip taking-over apparatuses utilized in the document or slip taking-over system of the embodiment into the name-of-document or slip-taking-over-apparatus entering column 87 and input the addresses and the port numbers of the document or slip taking-over apparatuses into the address-of-document or slip-taking-over-apparatus entering column 88 to thereby register a plurality of document or slip taking-over apparatuses.

(Registration of Existing System)

Figure 14:
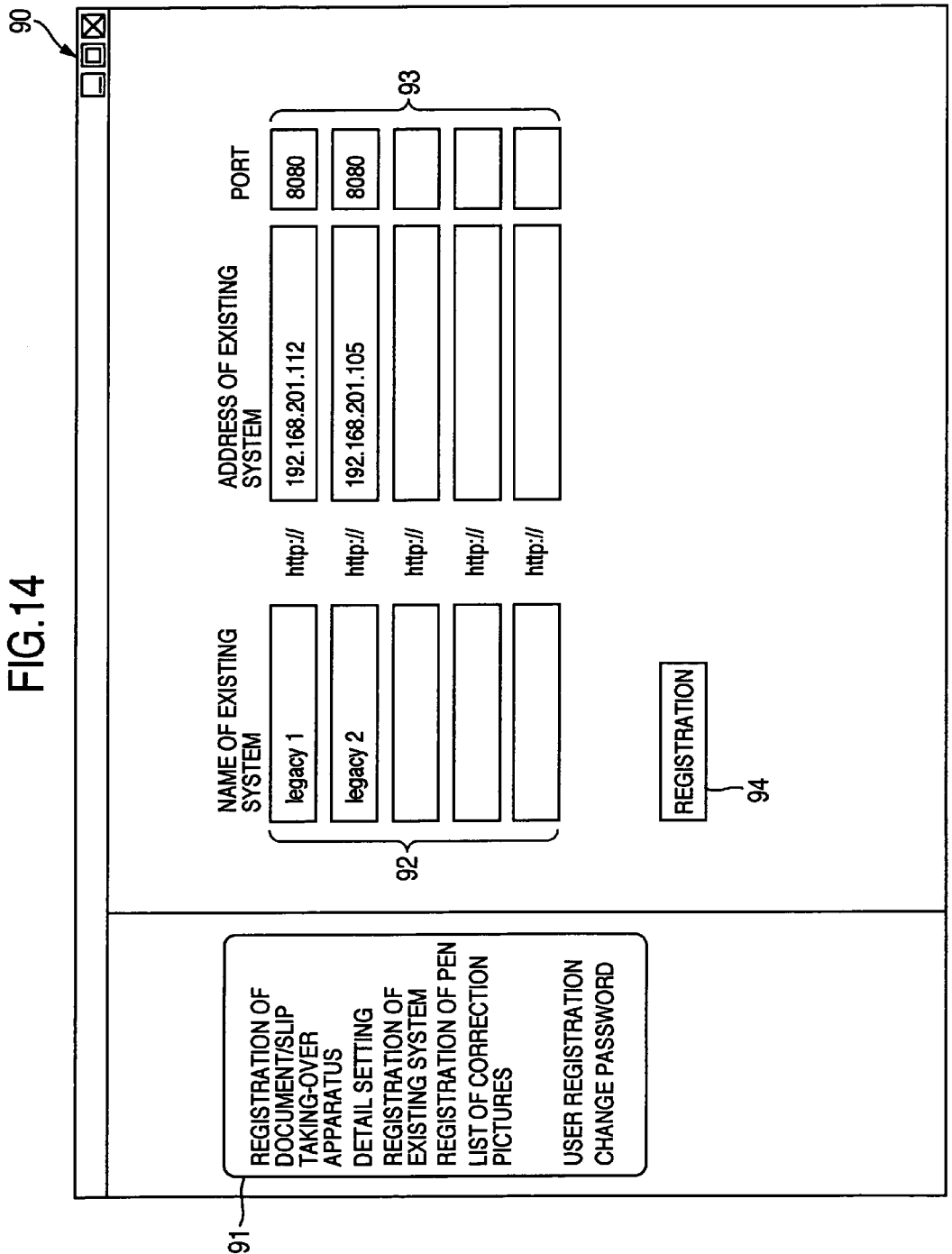
FIG. 14 is a diagram showing a registration picture of existing systems.

Next, the manager registers the existing system utilized in the document or slip taking-over system of the embodiment. For this purpose, the manager selects the item of "registration of existing system" from the menu area 86 of the document or slip taking-over apparatus registration picture 85. Consequently, the display picture is changed to a registration picture 90 of the existing system shown in FIG. 14. The existing system registration picture 90 shown in FIG. 14 includes a menu area 91, a name-of-existing-system entering column 92 for entering names of the existing systems to be registered, an address-of-existing system entering column 93 for entering addresses and port numbers of the existing systems to be registered, and a registration button 94 for registering the entered information. The manager uses this picture to input names of existing systems utilized in the document or slip taking-over system of the embodiment into the name-of-existing-system entering column 92 and input addresses and port numbers of the existing systems into the address-of-existing-system entering column 93 to thereby register a plurality of existing system.

(Registration of System Setting Information)

Figure 15:
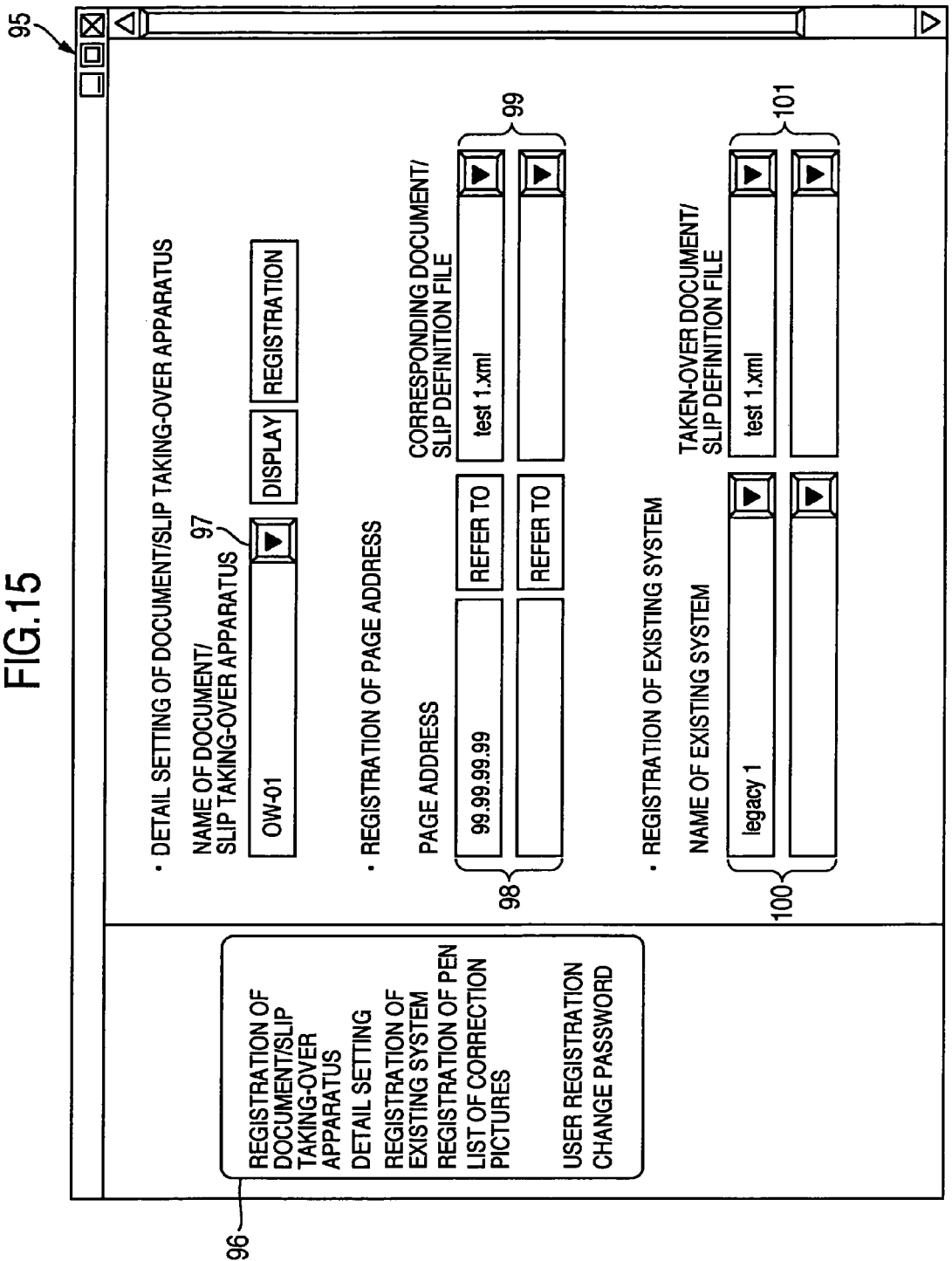
FIG. 15 is a diagram showing a detail setting picture of the document or slip taking-over apparatus.

Next, the manager selects the item of "detail setting" from the menu area 91 of the existing system registration picture 90 in order to make the detail setting of the document or slip taking-over apparatus 4. The display picture is changed to a detail setting picture 95 of the document or slip taking-over apparatus shown in FIG. 15. The document or slip taking-over apparatus detail setting picture 95 of shown in FIG. 15 includes a menu area 96, a document or slip taking-over apparatus selection column 97 for selecting the document or slip taking-over apparatus 4 to be subjected to detail setting, a page address entering column 98 for inputting a page address of the document or slip to be processed by the document or slip taking-over apparatus 4 selected in the selection column 97, a corresponding document or slip definition file selection column 99 for selecting a document or slip definition file corresponding to the document or slip 2 of the page address, an existing system selection column 100 for selecting the existing system 6 delivered by the document or slip taking-over apparatus 4 from the existing systems registered in the existing system registration picture 90 of FIG. 14, and a taken-over document or slip definition file selection column 101 for selecting the document or slip definition file in which specifications of the XML document or slip file delivered to the existing system 6 selected in the existing system selection column 100 are defined. The manager uses this picture to set the document or slip taking-over apparatus 4 for processing the document or slip data of the document or slip 2 and sets the existing system 6 to which the document or slip taking-over apparatus 2 delivers the XML document or slip data. The correspondence retrieval apparatus 5 registers the information set in the document or slip taking-over apparatus registration picture 85, the existing system registration picture 90 and the document or slip taking-over apparatus detail setting picture 95 as the system setting information in the second document or slip setting information database 80 of the correspondence retrieval apparatus 5 shown in FIG. 12 and transmits the system setting information and the document or slip space information of the page address defined in the system setting information to the document or slip taking-over apparatus 4 selected in the document or slip taking-over apparatus selection column 97 through the network 7. The document or slip taking-over apparatus 4 registers the received system setting information and the document or slip space information in the first document or slip setting information database 20 shown in FIG. 3.

As described above, by defining the system setting information for each of the plurality of document or slip taking-over apparatuses, for example, even when the electronic pen 1 is used to make entering in a plurality of kinds of documents/slips, the document or slip data is transmitted to the document or slip taking-over apparatus corresponding to each document or slip and is processed by the document or slip taking-over apparatus to be transmitted as the XML document or slip data to the existing system corresponding to each data from among the plurality of existing systems.

Referring now to the flow chart shown in FIG. 16, operation that the document or slip taking-over apparatus 4 processes the document or slip data transmitted from the electronic pen 1 into the XML document or slip data utilizable in the existing system 6 and delivers the XML document or slip data to the existing system 6 in the document or slip taking-over system of the embodiment in which the document or slip definition file and the system setting information have been registered is described (refer to FIGS. 1, 3 and 12).

First, the user of the document or slip taking-over system uses the electronic pen 1 to enter necessary matters in the document or slip 2. The electronic pen 1 add the information such as the identification ID of the electronic pen 1, the transmission time and the page address for identifying the document or slip 2 to the stroke data entered by the user of the electronic pen and transmits it as the document or slip data to the electronic pen terminal 3. The electronic pen terminal 3 which has received the document or slip data transmits a document or slip data processing request to the correspondence retrieval apparatus 5 in order to inquire the address of the document or slip taking-over apparatus 4 for processing the document or slip data (step S400).

The document or slip data processing request contains the page address of the document or slip 2. The correspondence retrieval apparatus 5, when received the document or slip data processing request (step S401), retrieves the document or slip taking-over apparatus 4 corresponding the page address of the document or slip 2 from the system setting information stored in the second document or slip setting information database 80 (step S402). The correspondence retrieval apparatus 5 transmits the address which is the connection information to the retrieved document or slip taking-over apparatus 4 to the electronic pen terminal 3 (step S403).

When the electronic pen terminal 3 receives the address of the document or slip taking-over apparatus 4 (step S404), the electronic pen terminal 3 transmits the document or slip data received from the electronic pen 1 to the document or slip taking-over apparatus 4 of the address (step S405). When the document or slip taking-over apparatus 4 receives the document or slip data (step S406), the document or slip taking-over apparatus 4 registers the document or slip data in the document or slip temporary file stored in the temporary information database 22. The document or slip taking-over apparatus 4 transmits the memory clear signal to the electronic pen terminal 3 in order to clear the memory 14 of the electronic pen 1 (step S407). When the electronic pen terminal 3 receives the memory clear signal (step S408), the electronic pen terminal 3 transmits the memory clear signal to the electronic pen 1 to clear the memory 14 of the electronic pen 1 (step S409). The document or slip taking-over apparatus 4 performs recognition of characters and taking-out of images contained in the document or slip data registered in the document or slip temporary file on the basis of the document or slip definition file stored in the first document or slip setting information database 20 and prepares the XML document or slip data (step S410) to register the prepared XML document or slip data in the document or slip information database 26 (step S411).

When the existing system 6 transmits the document or slip request to the document or slip taking-out apparatus 4 (step S412), the document or slip taking-out apparatus 4 which has received the document or slip request (step S413) refers to the document or slip information database 21 and, when there is an XML document or slip data which is not transmitted to the existing system 6, transmits the XML document or slip data to the existing system 6 (step S414). The existing system 6 receives the XML document or slip data (step S415) and performs the predetermined processing. As described above, the handwritten information inputted by the user of the document or slip taking-out apparatus 4 by means of the electronic pen 1 is delivered as the XML document or slip data to the existing system 6. The operation in steps S406 to S415 corresponds to the flow chart shown in FIGS. 6 to 8.

The embodiments of the present invention have been described in detail with reference to the drawings, while the foregoing is just the embodiments and various changes or modifications and improvements may be made in the present invention on the basis of the knowledge of those skilled in the art without departing from the spirit and scope of the present invention as hereinafter claimed. For example, the electronic pen and the user may be registered in the correspondence retrieval apparatus and the electronic pen and the user may be subjected to authentication using a password or electronic key so that the security of the document or slip taking-over system can be improved. Further, in this case, the access authority may be set to the user to distinguish the user and the manager.

According to the present invention, the handwritten information can be utilized easily without performing complicated processing in the system disposed at the latter stage which utilizes the information.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A document taking-over system including an electronic pen terminal device provided with an electronic pen which gets information written by hand on a document prepared to be able to specify a kind thereof together with kind information of said document as electronic data and for transmitting said electronic data, a document taking-over apparatus for processing said electronic data to produce it as document information and a system disposed at a latter stage to utilize said document information, which are connected to one another through a network;

said document taking-over apparatus comprising:
communication means for receiving said electronic data from said electronic pen terminal device through said network and transmitting said document information to said system at the latter stage;
memory means for storing format information which defines specifications for converting said electronic data into a predetermined format utilizable in said system at the latter stage;
recognition means for taking out characters or selection item from said electronic data on the basis of said format information to recognize said taken-out characters or selection item;
preparation means for preparing said document information of said predetermined format on the basis of said characters or selection item recognized by said recognition means and said format information; and
registration means for registering said document information in said memory means and transmitting said document information to said system at the latter stage by means of said communication means.

2. A document taking-over system according to claim 1, wherein
said recognition means comprises a recognition unit connected to said network.

3. A document taking-over system according to claim 1, wherein
said document taking-over apparatus comprises:
preparing a display picture for inputting correspondence information indicating correspondence of said kind information of said document, said format information and said system at the latter stage by means of said preparation means; and
registering said correspondence information inputted by using said display picture in said memory means by means of said registration means and transmitting said document information to said system at the latter stage by means of said communication means on the basis of said correspondence information.

4. A document taking-over system according to claim 3, further comprising
a correction terminal apparatus connected to said network;
and wherein
said document taking-over apparatus comprises:
preparing a list picture for displaying a list of document information by means of said preparation means and transmitting said list picture to said correction terminal apparatus by means of said communication means;
preparing, when document information one wishes to correct is selected from said list picture, a correction picture for correcting said selected document information and transmitting said correction picture to said correction terminal apparatus by means of said communication means; and
registering said document information corrected in said correction picture in said memory means by means of said registration means.

5. A document taking-over system according to claim 1, wherein
said document taking-over apparatus comprises:
preparing a display picture for designating an entering area of said document and an input picture for inputting identification information for specifying at least said entering area for each entering area by means of said preparation means as separate pictures or as the same picture; and
registering specifications inputted by using said display picture as said format information in said memory means by means of said registration means.

6. A document taking-over system according to claim 5, wherein
information inputted in said input picture further contains a name of said entering area, information as to whether information contained in said entering area is transferred to said system at the latter stage or not and information as to whether characters or selection item in said entering area is recognized or not.

7. A document taking-over system according to claim 6, wherein
said predetermined format is an XML format relating data recognized as said electronic data or characters or selection item to said format information.

8. A document taking-over system including a terminal device provided with an electronic pen which gets information written by hand on a document prepared to be able to specify a kind thereof together with kind information of said document as electronic data and for transmitting said electronic data, a document taking-over apparatus for processing said electronic data to produce it as document information, a correspondence retrieval apparatus for transmitting connection information to said document taking-over apparatus to said terminal device, and a system disposed at a latter stage to utilize said document information, which are connected to one another through a network;

said correspondence retrieval apparatus comprising:
first memory means for storing at least correspondence information for causing said kind information of said document to correspond to said connection information to said document taking-over apparatus;
first communication means for communicating with said terminal device through said network; and
retrieval means for searching, when said kind information of said document is received from said terminal device, said correspondence information for said connection information to said document taking-over apparatus corresponding to said kind information of said document to transmit said connection information to said terminal device;

said document taking-over apparatus comprising:
second communication means for receiving said electronic data from said terminal device through said network and transmitting said document information to said system at the latter stage;
second memory means for storing format information which defines specifications for converting said electronic data into a predetermined format utilizable in said system at the latter stage;
recognition means for taking out characters or selection item from said electronic data on the basis of said format information to recognize said taken-out characters or selection item;
preparation means for preparing said document information of said predetermined format on the basis of said characters or selection item recognized by said recognition means and said format information; and
registration means for registering said document information in said memory means and transmitting said document information to said system at the latter stage by means of said communication means.

9. A document taking-over system according to claim 8, wherein
said correspondence retrieval apparatus further comprises
second preparation means for preparing separate display pictures or the same display picture for inputting at least said connection information to said document taking-over apparatus, connection information to said system at the latter stage, said kind information of said document, said format information and information indicative of correspondence of said document taking-over apparatus and said system at the latter stage; and
second registration means for registering said information inputted by means of said display picture as said correspondence information in said first memory means and transmitting said correspondence information to said document taking-over apparatus by means of said first communication means.

10. A document taking-over system according to claim 9, wherein
said document taking-over apparatus comprises:
preparing a list picture for displaying a list of document information by means of said preparation means and transmitting said list picture to said terminal device by means of said second communication means;
preparing, when document information one wishes to correct is selected from said list picture, a correction picture for correcting said selected document information and transmitting said correction picture to said terminal device by means of said second communication means; and
registering said document information corrected in said correction picture in said second memory means by means of said registration means.

11. A document taking-over system comprising:
a) an electronic pen for getting information written by hand on a document prepared to be able to specify a kind thereof together with kind information of said document as electronic data;
b) an electronic pen terminal device for transmitting said electronic data; and
c) a document taking-over apparatus for processing said electronic data to produce it as document information and including:
c-1) communication means for receiving said electronic data transmitted from said electronic pen terminal device and transmitting said document information;
c-2) memory means for storing format information which defines specifications for converting said electronic data into a predetermined format;
c-3) recognition means for taking out characters or selection item from said electronic data on the basis of said format information to recognize said taken-out characters or selection item;
c-4) preparation means for preparing said document information of said predetermined format by using said characters or selection item recognized by said recognition means and said format information; and
c-5) registration means for registering said document information to be transmitted through said communication means.

\* \* \* \* \*